(12) United States Patent
Lehmann et al.

(10) Patent No.: US 9,506,352 B2
(45) Date of Patent: Nov. 29, 2016

(54) TURBINE BLADE OF A GAS TURBINE WITH SWIRL-GENERATING ELEMENT AND METHOD FOR ITS MANUFACTURE

(71) Applicant: Rolls-Royce Deutschland Ltd & Co KG, Blankenfelde-Mahlow (DE)

(72) Inventors: Knut Lehmann, Berlin (DE); Tijana Filipova, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 498 days.

(21) Appl. No.: 14/016,692

(22) Filed: Sep. 3, 2013

(65) Prior Publication Data

US 2014/0079539 A1    Mar. 20, 2014

(30) Foreign Application Priority Data

Sep. 4, 2012  (DE) .................. 10 2012 017 491

(51) Int. Cl.
| | |
|---|---|
| *F01D 5/18* | (2006.01) |
| *F01D 5/08* | (2006.01) |
| *B23P 15/02* | (2006.01) |
| *B23P 15/04* | (2006.01) |

(52) U.S. Cl.
CPC .............. *F01D 5/188* (2013.01); *B23P 15/02* (2013.01); *B23P 15/04* (2013.01); *F01D 5/186* (2013.01); *F05D 2240/127* (2013.01); *F05D 2260/2212* (2013.01); *Y02T 50/673* (2013.01); *Y02T 50/676* (2013.01); *Y10T 29/49336* (2015.01); *Y10T 29/49337* (2015.01); *Y10T 29/49339* (2015.01)

(58) Field of Classification Search
CPC ................ F05D 2240/127; F05D 2260/2212; F01D 5/188; F01D 5/186

USPC ........ 415/115–116, 175–177; 416/97 R, 96 A
See application file for complete search history.

(56) References Cited

U.S. PATENT DOCUMENTS

| | | | |
|---|---|---|---|
| 2,752,753 A * | 7/1956 | Dooley ..................... | F23R 3/14 60/748 |
| 2,843,354 A | 7/1958 | Smith | |
| 6,547,525 B2 | 4/2003 | Haehnle et al. | |
| 7,665,965 B1 | 2/2010 | Liang | |
| 7,824,156 B2 | 11/2010 | Dellmann et al. | |
| 2008/0187439 A1 * | 8/2008 | Iyer ....................... | F04D 29/441 415/204 |
| 2012/0076665 A1 | 3/2012 | Janke et al. | |

FOREIGN PATENT DOCUMENTS

| | | | |
|---|---|---|---|
| DE | 8153534 | 10/1952 | |
| DE | 10053356 | 5/2002 | |
| DE | 102010046331 | 3/2012 | |
| EP | 1621730 | 2/2006 | |
| JP | 60099933 A * | 6/1985 | ........... B05B 7/1495 |

OTHER PUBLICATIONS

German Search Report dated Jan. 11, 2013 from counterpart German App No. 10 2012 017 491.8.

* cited by examiner

*Primary Examiner* — Theresa Trieu
(74) *Attorney, Agent, or Firm* — Shuttleworth & Ingersoll, PLC; Timothy Klima

(57) ABSTRACT

The present invention relates to a turbine blade of a gas turbine with an airfoil arranged on a blade root and having at least one cooling air duct running in the longitudinal direction of the turbine blade, arranged inside the turbine blade and extending through the blade root, characterized in that at least one swirl-generating element is arranged in the transitional area between blade root and airfoil in the cooling air duct, with the swirl-generating element including an outer ring and several swirl-generating stator vanes arranged thereon, which are connected to a centric area, as well as to a method for its manufacture.

5 Claims, 5 Drawing Sheets

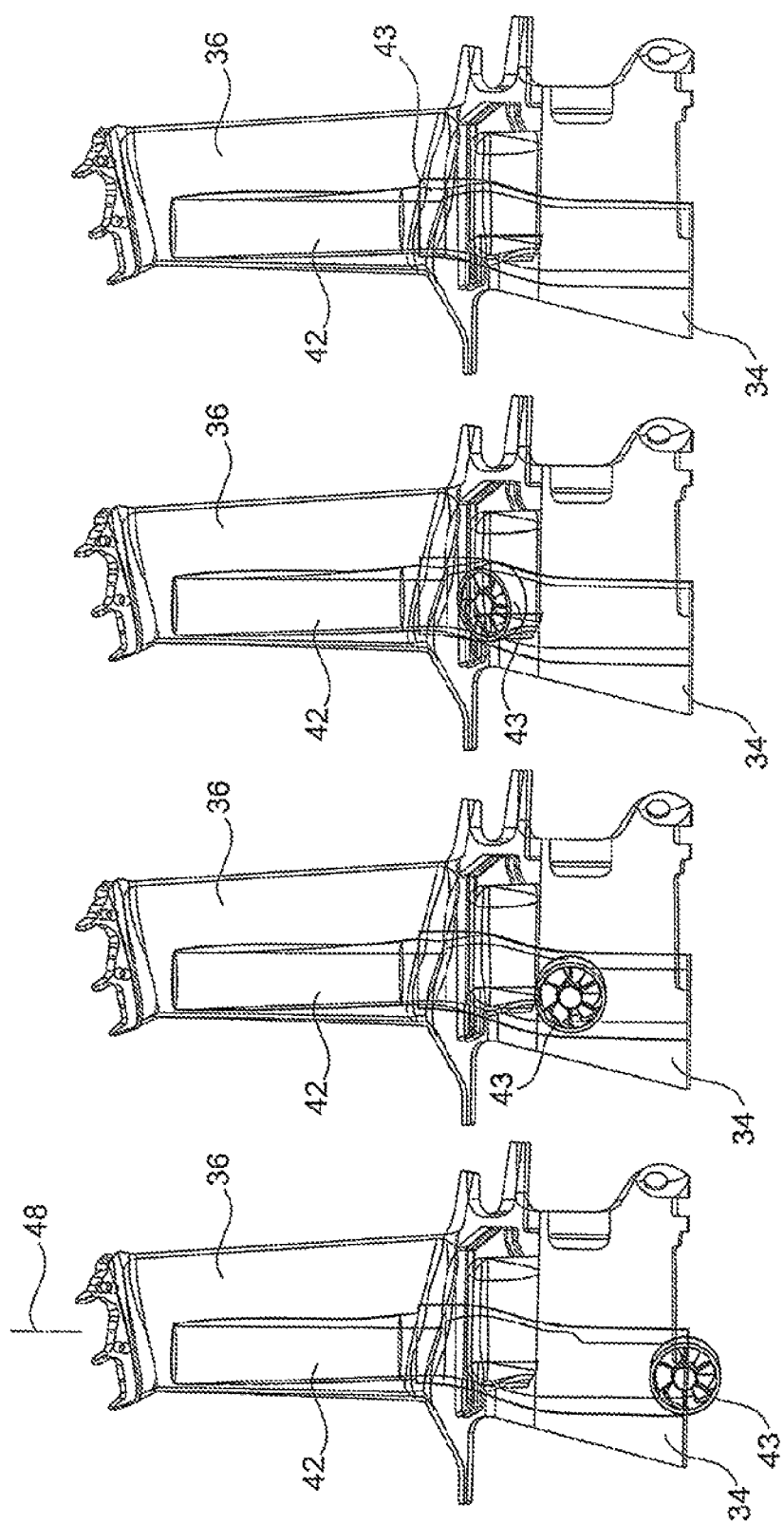

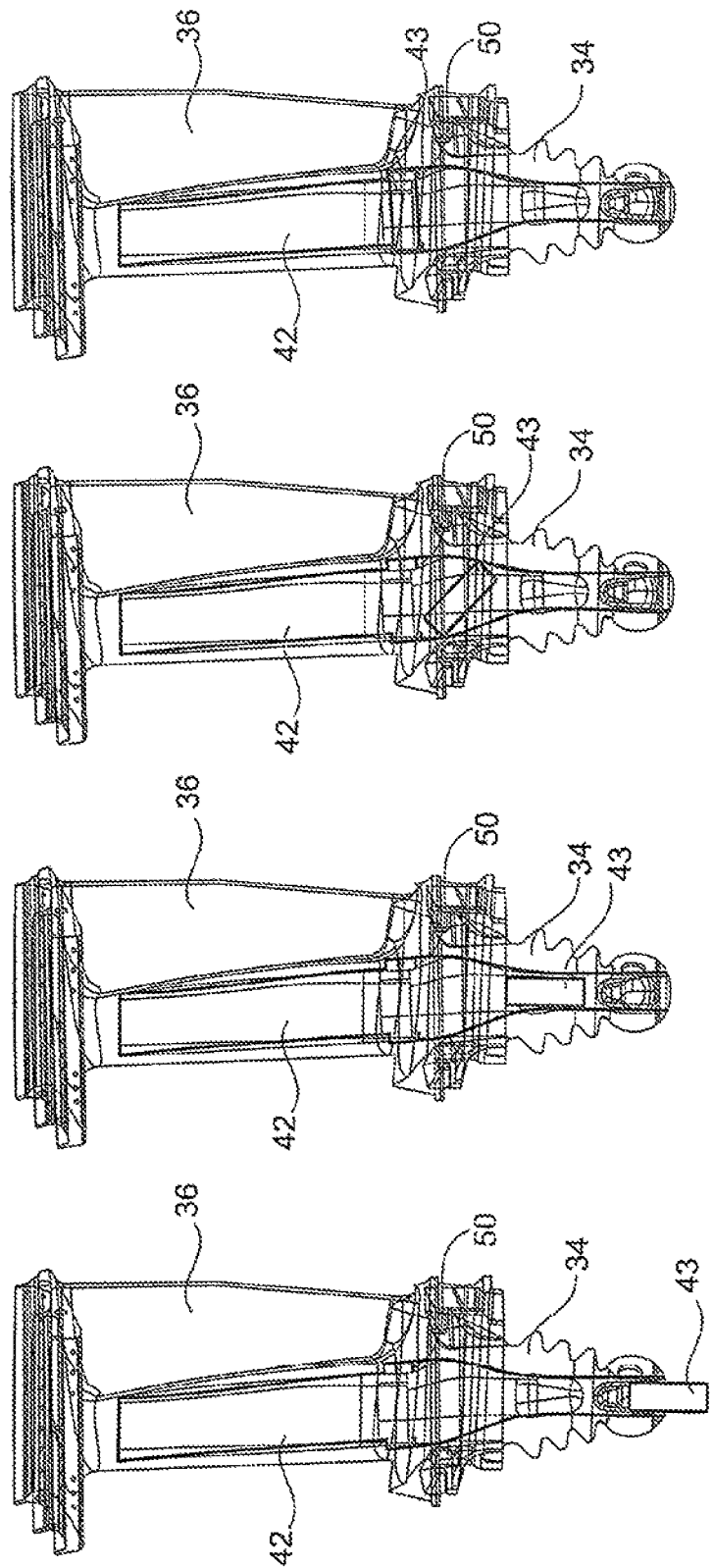

TURBINE BLADE OF A GAS TURBINE WITH SWIRL-GENERATING ELEMENT AND METHOD FOR ITS MANUFACTURE

This application claims priority to German Patent Application 102012017491.8 filed Sep. 4, 2012, the entirety of which is incorporated by reference herein.

This invention relates to a turbine blade of a gas turbine and to a method for its manufacture.

In detail, the invention relates to a turbine blade of a gas turbine with an airfoil arranged on a blade root and having at least one cooling air duct running in the longitudinal direction of the turbine blade, arranged inside the turbine blade and extending through the blade root.

It is known from the state of the art to provide the airflow entering the cooling air duct with a swirl in order to improve heat transfer and hence cooling.

A turbine blade known from DE 100 53 356 A1 has, for efficient internal cooling, an inner leading-edge cooling duct with round duct cross-section and cooling air supply holes arranged one above the other over the length of the cooling duct, which lead substantially tangentially from a coolant duct provided in the blade into the leading-edge cooling duct and which generate cooling air vortices therein in order to achieve a high cooling effect. This design has the drawback that the swirl flow thus created does not develop optimally over the entire length of the cooling air duct. Hence the flow phenomena effecting cooling, for example the core of the return flow and the boundary layer instabilities, do not develop optimally. A further disadvantage is that the overall structure has a lower strength due to the plurality of recesses.

EP 1 621 730 A1 describes a solution in which helically arranged ribs are formed inside the cooling air duct and are intended to impart a swirl to the flow. This design has however the disadvantage that only an insufficient swirl flow results, since only low swirl rates can be achieved. Due to the high pitch angle of the ribs, the flow veers towards the center, so that the ribs act mainly as turbulators. In addition, a design of this type is very expensive to manufacture.

It was furthermore proposed to generate a swirl flow or cyclonic flow by a tangential inflow in a duct in the blade root. This however results in relatively high aerodynamic losses.

An air-cooled gas-turbine blade is known from DE 853 534 B, where a swirl element is placed inside a cavity of the completed blade, said swirl element being fitted after completion of the blade and before the latter is connected to a disk or wheel rim. The swirl element extends over a substantial length of the interior of the blade.

The object underlying the present invention is to provide a turbine blade of the type specified at the beginning and a method for its manufacture, which blade, while being simply designed, easily and cost-effectively producible and providing high mechanical strength, guarantees an optimization of the heat transfer through the cooling air duct.

It is a particular object to provide solution to the above problems by a combination of the features described herein. Further advantageous embodiments will become apparent from present description.

It is thus provided in accordance with the invention that at least one swirl-generating element, which is preferably designed as a separate element, is arranged in the transitional area between blade root and airfoil in the cooling air duct. The invention thus describes a turbine blade with an airfoil arranged on a blade root which has at least one cooling air duct arranged inside the turbine blade and running in the longitudinal direction of the turbine blade, and hence extending radially relative to the machine axis, which cooling air duct extends through the blade root, with at least one swirl-generating element being arranged in the transitional area between blade root and airfoil inside the cooling air duct.

The invention thus relates to the generation of a swirl flow in a cooling air duct running radially (relative to the engine axis) inside the turbine blade. Hence the generation of a swirl is achieved in accordance with the invention inside the bladed swirl-generating element, which is designed as a guide vane arrangement. The swirl-generating element is arranged in the transitional area between the blade root and the airfoil or at a suitable point inside the blade root, and effects a flow-optimized swirl generation or cyclone generation. Since the swirl-generating element in accordance with the invention is made as a separate component and then inserted into the turbine blade and fixed there, the swirl-generating element can be manufactured in a precise and flow-optimized manner. The swirl-generating element in accordance with the invention is preferably designed as a casting, and can advantageously be made from the same material as the turbine blade.

In a preferred embodiment of the invention, the swirl-generating element has an outer ring and several swirl-generating stator vanes arranged thereon. The latter can be connected in a preferred manner to a centric area.

In an alternative embodiment of the invention, it is however also possible, instead of a separate swirl-generating element, to design the latter in one piece with the blade and hence to create it integrally, preferably during casting of the blade.

When a separate swirl-generating element is used, it is particularly advantageous that it can be placed into the turbine blade afterwards and fixed there. This enables the swirl-generating element, which has with its outer ring the form of a flat cylinder, to be inserted along its vertical axis, in other words transversely to the cylinder axis, into the turbine blade and then rotated into the required position at a certain point inside the cooling air duct. The swirl-generating element can then be fixed in its final position in a suitable manner by means of a snap ring, clips, integrally cast lugs or in similar manner. This ensures both radial fixing inside the blade and also prevention of rotation, so that the required swirl flow develops optimally.

The solution in accordance with the invention is characterized by a variety of merits. Firstly there is a reduced pressure loss when a cyclonic flow is generated, compared with the solutions known from the state of the art. Due to the reduced pressure loss, there is a higher reserve pressure for film cooling supply. A further advantage is that in comparison with the state of the art, a simplified arrangement and embodiment of the cooling air supply ducts inside the blade root can be achieved, and as a result simplified casting geometries. Furthermore, the solution in accordance with the invention does not lead to any weakening of the mechanical properties of the turbine blade. In accordance with the invention, a cyclonic cooling concept for the turbine blade can thus be obtained, which is advantageous in respect of flow conditions and heat transfer and which leads, for example, to a saving in cooling air, to a reduction in the surface temperature of the turbine blade and to improved durability of the blading.

With regard to the manufacturing method in accordance with the invention for making the turbine blade, it is provided in a first variant of the invention that the swirl-generating element is made as a separate component. This can, as already mentioned, consist of the same or a different material as the turbine blade. After manufacture of the turbine blade, the swirl-generating element is, in accordance with the invention, inserted through the blade root into the interior of the turbine blade and positioned there. Positioning can be achieved by, for example, locking it by means of an engaging lug or similar, with appropriate stops or projections being provided in the interior of the turbine blade.

It is particularly advantageous when the swirl-generating element is inserted through the blade root with its center axis in a position transverse to a blade longitudinal axis. Since the recess in the blade root is usually not of arbitrary size and since the blade root does not have a round cross-section, but a rectangular one, it is thus possible to dimension the recess of the blade root accordingly and to insert the swirl-generating element. In the transitional area from the blade root to the airfoil, the cross-section of the interior of the turbine blade widens in accordance with the invention (cooling air duct and leading-edge cooling air duct, respectively). In this area, the swirl-generating element is rotated in accordance with the invention and then positioned such that its center axis is arranged substantially parallel to the blade longitudinal axis.

In a further variant of the invention, it is provided that the swirl-generating element is already produced in one piece with the turbine blade during casting of the latter. It is particularly advantageous here when the swirl-generating element is provided in a core used for manufacture of the cooling air duct or of the leading-edge cooling air duct of the turbine blade. These cores are usually made as ceramic cores. With the procedure in accordance with the invention, the swirl-generating element is, after chemical dissolution of the ceramic core, thus created at the right position inside the turbine blade.

The present invention is described in the following in light of the accompanying drawing, showing an exemplary embodiment. In the drawings, FIG. 1 shows a schematic representation of a gas-turbine engine in accordance with the present invention, FIG. 2 shows a stator vane and turbine blade arrangement of an aircraft engine, FIG. 3 shows perspective views of a swirl-generating element in accordance with the present invention, FIGS. 4A and 4B show a first assembly step of the swirl-generating element into the turbine bade, from a circumferential perspective and an axial perspective, respectively;

FIGS. 5A and 5B show a second assembly step of the swirl-generating element into the turbine bade, from a circumferential perspective and an axial perspective, respectively;

FIGS. 6A and 6B show a third assembly step of the swirl-generating element into the turbine bade, from a circumferential perspective and an axial perspective, respectively; and FIGS. 7A and 7B show a final position of the swirl-generating element into the turbine bade, from a circumferential perspective and an axial perspective, respectively.

Figure 1:
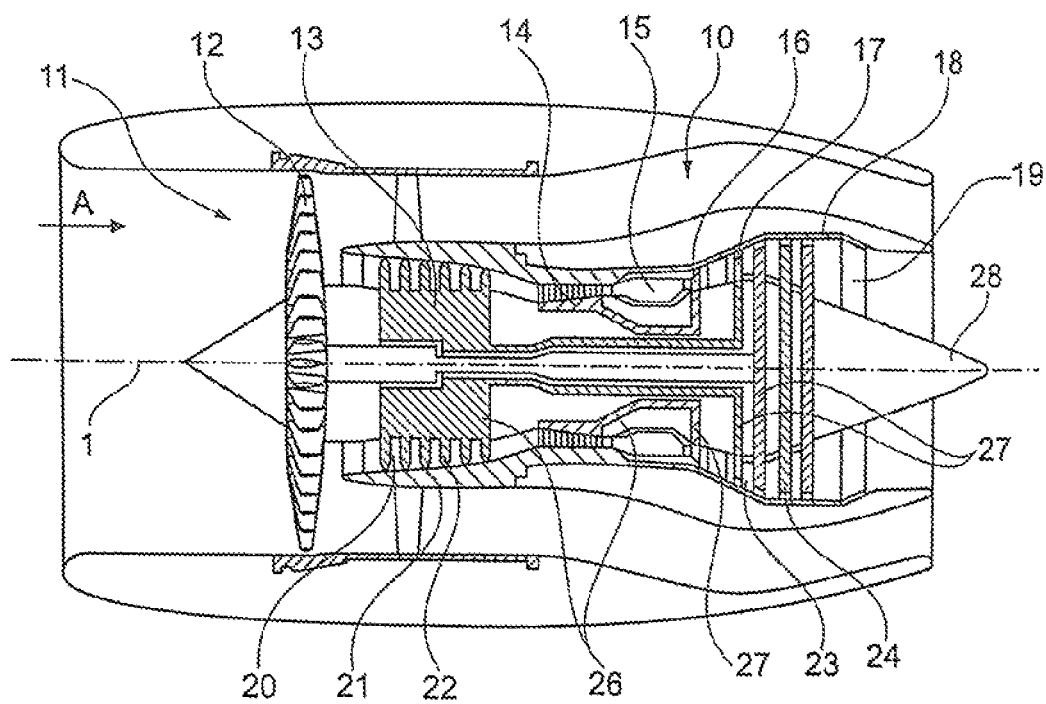

The gas-turbine engine 10 in accordance with FIG. 1 is a generally represented example of a turbomachine where the invention can be used. The engine 10 is of conventional design and includes in the flow direction, one behind the other, an air inlet 11, a fan 12 rotating inside a casing, an intermediate-pressure compressor 13, a high-pressure compressor 14, a combustion chamber 15, a high-pressure turbine 16, an intermediate-pressure turbine 17 and a low-pressure turbine 18 as well as an exhaust nozzle 19, all of which being arranged about a center engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

Figure 2:
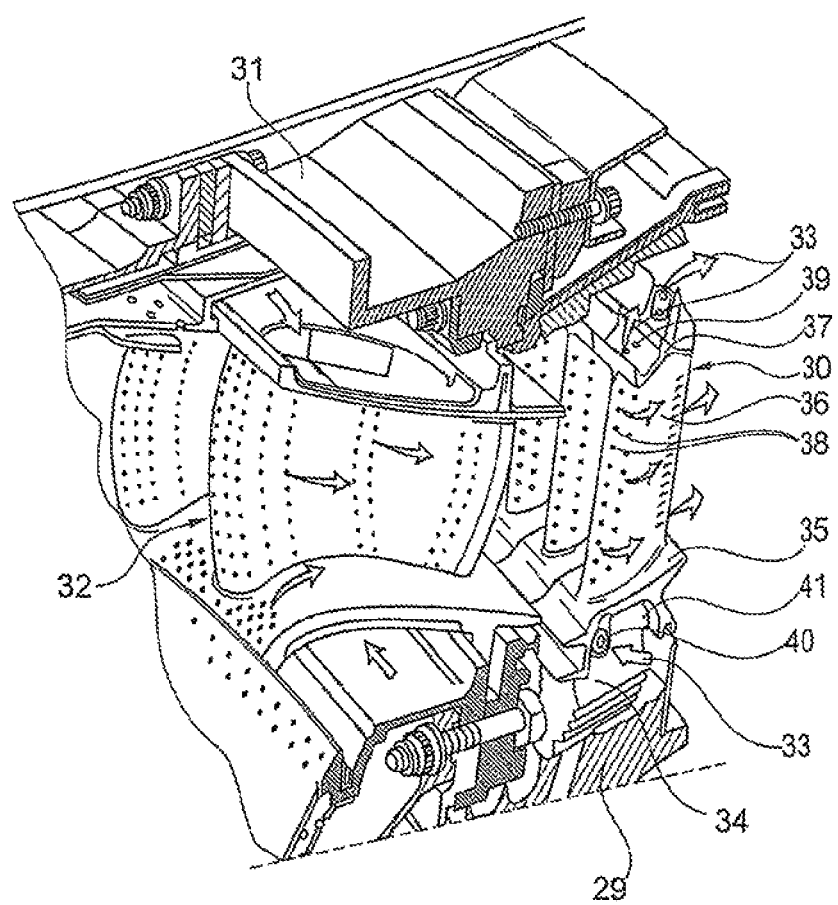

As FIG. 2 shows, the turbine of a gas-turbine engine includes a plurality of turbine blades 30 connected to a rotor disk 29, and stator vanes 32 arranged upstream thereof, fastened to the engine casing 31 and cooled by external cooling (film cooling) and internal cooling with cooling air supplied by a compressor and identified by arrows 33. The turbine blade 30 has a blade root 34 held on the rotor disk 29, an inner platform 35, an airfoil 36 and an outer platform 37. The airfoil 36 designed for internal cooling as a hollow body is designed with cooling ducts and film cooling holes 38, and with air outlet openings 39 at the blade tip. Cooling air (arrow 33) passes out of the cavity 41 provided underneath the platforms 37 between two adjacent turbine blades 30 from two opposite sides (suction and pressure sides), through air guide ducts 40 each extending from the opposite sides of the blade root 34, into the lower section of a leading-edge cooling duct 42 extending inside the turbine blade 30 along the blade leading edge from the blade root 34 to the blade tip (FIGS. 4 to 7). The cooling air 33 supplied to the leading-edge cooling duct 42 flows via the film cooling holes 38 intended for external cooling of the airfoil 36 and via the air outlet openings 39 to the outside and/or into further cooling ducts (not shown) present in the airfoil 36.

Figure 3:
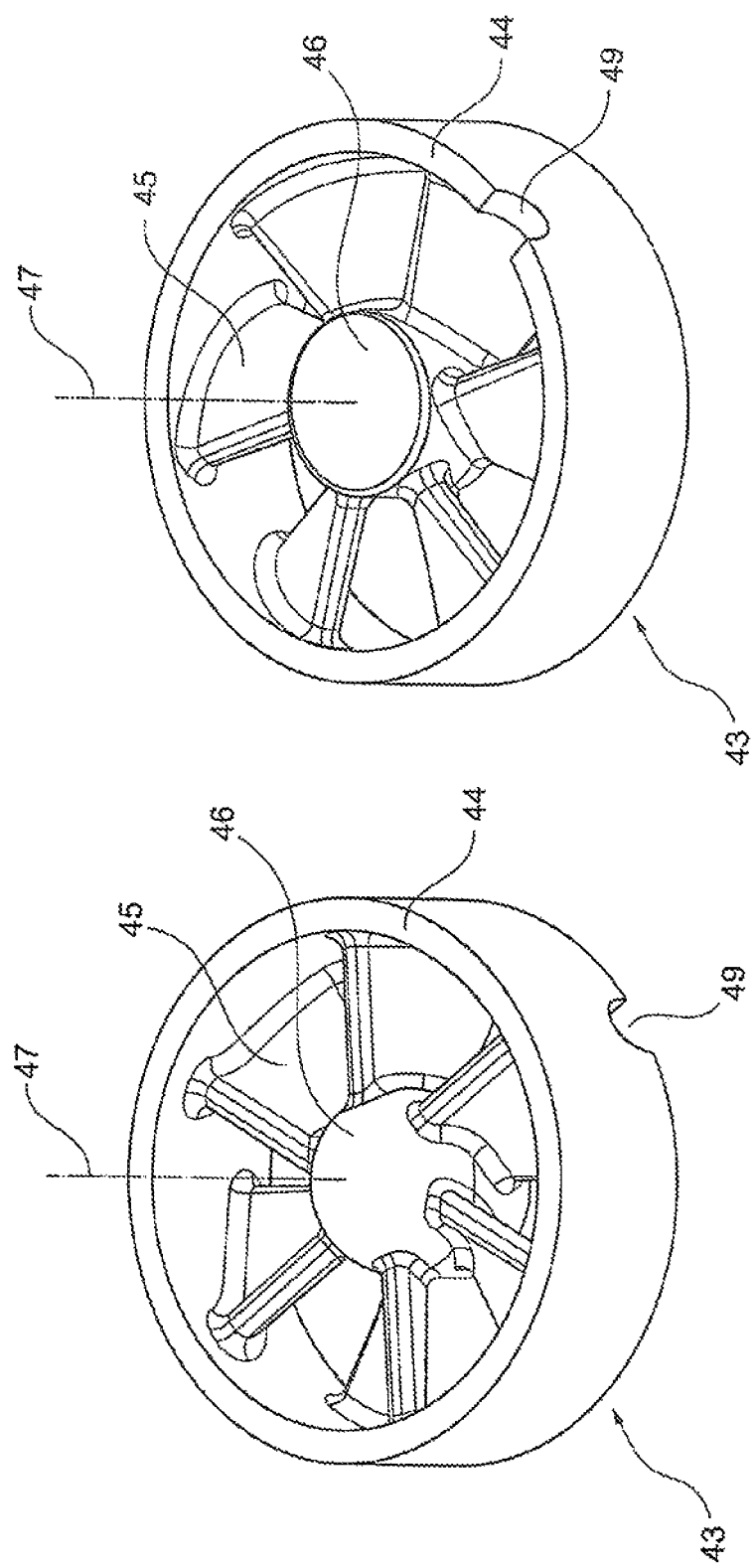

FIG. 3 shows in a perspective representation a swirl-generating element 43 in accordance with the invention, which has an outer ring 44 designed in the form of a flat cylinder. Swirl-generating stator vanes 45 are connected in one piece to the ring 44 and are designed in a flow-optimized way. A centric area 46 connects the radially inner end areas of the swirl-generating stator vanes 45. FIG. 3 shows in the left-hand representation the inflow side and in the right-hand representation the outflow side of the swirl-generating element in accordance with the invention.

The reference numeral 49 refers to a locking recess which is used to achieve the locking of the swirl-generating element by means of an engaging lug 50 provided inside the cooling air duct 42.

FIGS. 4 to 7 each show in the side view and in the front view the individual assembly steps for insertion of the swirl-generating element 43 in accordance with the invention into the cooling air duct 42. As shown in FIGS. 4A and 4B, the swirl-generating element 43 is inserted upright through the blade root into the cooling air duct 42. FIGS. 5A and 5B show an assembly step in which the swirl-generating element 43 is located in the blade root. FIGS. 6A and 6B show a subsequent assembly state in which the swirl-generating element 43 is tilted in order to fix it subsequently in the final position as shown in FIGS. 7A and 7B, at the transitional area of the cooling air duct 42 from the blade root 34 into the airfoil 36. Fixing is for example achieved by means of contact rings, lugs, clip elements or the like.

LIST OF REFERENCE NUMERALS

1 Engine axis
10 Gas-turbine engine/core engine
11 Air inlet
12 Fan
13 Intermediate-pressure compressor (compressor)
14 High-pressure compressor
15 Combustion chamber
16 High-pressure turbine
17 Intermediate-pressure turbine
18 Low-pressure turbine
19 Exhaust nozzle
20 Guide vanes
21 Engine casing
22 Compressor rotor blades
23 Stator vanes
24 Turbine blades
26 Compressor drum or disk
27 Turbine rotor hub
28 Exhaust cone
29 Rotor disk
30 Turbine blade/airfoil
31 Engine casing
32 Stator vanes
33 Cooling air, rotating cooling air layer (arrow)
34 Blade root
35 Inner platform
36 Airfoil
37 Outer platform
38 Film cooling hole
39 Air outlet opening
40 Nozzle-shaped air supply duct
41 Cavity
42 Cooling air duct, leading-edge cooling duct
43 Swirl-generating element
44 Ring
45 Swirl-generating stator vane
46 Centric duct
47 Center axis of swirl-generating element
48 Blade longitudinal axis of turbine blade 30
49 Locking recess
50 Engaging lug

What is claimed is:

1. A method for manufacturing a turbine blade, comprising the steps of:
casting the turbine blade, the turbine blade including:
a blade root;
an airfoil arranged on the blade root;
a cooling air duct running in a longitudinal direction of the turbine blade positioned inside and extending through the blade root and the airfoil;
providing a swirl-generating element manufactured as a separate component from the turbine blade from the step of casting the turbine blade, the swirl-generating element including an outer ring, a centric area and a plurality of swirl-generating stator vanes connecting between the outer ring and the centric area;
after the step of casting the turbine blade, inserting the swirl-generating element through the blade root with a center axis of the swirl-generating element in a position transverse to a blade longitudinal axis;
rotating the swirl-generating element in the cooling air duct;
positioning the swirl-generating element in a transitional area in the cooling air duct between the blade root and the airfoil with the center axis substantially parallel to the blade longitudinal axis;
providing the swirl-generating element with a locking recess to engage an engaging lug provided in the cooling air duct such that the locking recess is engaged with the engaging lug and the swirl-generating element is locked in the turbine blade upon the positioning.

2. The method of claim 1, and further comprising dimensioning the outer ring smaller than the cooling air duct at the blade root to be insertable into the cooling air duct from the blade root.

3. The method of claim 1, and further comprising providing that the swirl-generating element is made from a same material as the turbine blade.

4. The method of claim 1, and further comprising providing the swirl-generating element as a casting.

5. A method for manufacturing a turbine blade, comprising the steps of:
providing a core for casting the turbine blade, the turbine blade including:
a blade root,
an airfoil arranged on the blade root and including a cooling air duct running in a longitudinal direction of the turbine blade positioned inside and extending through the blade root and the airfoil,
positioning a swirl-generating element in a transitional area in the core between the blade root and the airfoil in the cooling air duct, the swirl-generating element including an outer ring, a centric area and a plurality of swirl-generating stator vanes arranged connecting between the outer ring and the centric area;
providing the swirl-generating element in the core for casting the turbine blade and wherein the swirl-generating element remains after removal of the core as a one-piece constituent of the turbine blade.

* * * * *